(12) United States Patent
Crump

(10) Patent No.: US 8,142,882 B1
(45) Date of Patent: Mar. 27, 2012

(54) METHOD AND APPARATUS FOR CROSS-SECTIONAL SCANNING OF PARTS

(75) Inventor: Craig D. Crump, Eden Prairie, MN (US)

(73) Assignee: The Crump Group, Inc., Eden Prairie, MN (US)

( * ) Notice: Subject to any disclaimer, the term of this patent is extended or adjusted under 35 U.S.C. 154(b) by 1151 days.

(21) Appl. No.: 11/939,754

(22) Filed: Nov. 14, 2007

(51) Int. Cl.
*B32B 7/02* (2006.01)
*G01B 11/24* (2006.01)

(52) U.S. Cl. .................................. 428/212; 356/601
(58) Field of Classification Search ............... 428/212; 356/601
See application file for complete search history.

(56) References Cited

U.S. PATENT DOCUMENTS

| | | |
|---|---|---|
| 5,139,338 A | 8/1992 | Pomerantz et al. |
| 5,621,338 A | 4/1997 | Crump |
| 5,880,961 A | 3/1999 | Crump |
| 6,091,999 A | 7/2000 | Crump et al. |
| 6,407,735 B2 | 6/2002 | Kressin |

OTHER PUBLICATIONS

Crump, "3-D, Non-Contact Scanning for Inspection," Moldmaking Technology, Mar. 2007 (reprint), Gardner Publications, Inc., Cincinnati, Ohio.

*Primary Examiner* — Lore Jarrett
(74) *Attorney, Agent, or Firm* — Moore & Hansen, PLLC

(57) ABSTRACT

Improved methods and apparatus for cross-sectional scanning of transparent (or nearly transparent) parts that cannot otherwise be effectively scanned, because the transparency of the part prevents the scanner from discriminating between the part and the potting material, into which the part is placed, as viewed through the transparent material. Certain coatings added to such parts create opacity where the coatings contact the parts. Thus, scanning of the coated part is not interpreted as scanning of the potting material into which the parts are placed.

17 Claims, 4 Drawing Sheets

METHOD AND APPARATUS FOR
CROSS-SECTIONAL SCANNING OF PARTS

BACKGROUND

Cross-sectional scanning of parts, and the processing of the data generated in the same, is described in U.S. Pat. Nos. 5,139,338; 5,261,648; 5,880,961; 6,091,099; and 6,407,735. Such techniques, broadly speaking, involve the repeated optical scanning of a part that has been encased in a potting material so that, as successive layers of the part/potting combination are removed, data regarding the dimensions of the part are generated by a computer processing the scanned data of the image of each successive surface remaining after the preceding layer is removed. The optical contrast between the portions of the surface due to the potting material and those due to the material of the part identifies the dimensions of the part itself. Post-acquisition data processing techniques improve the utility of the data for various purposes. One such technique is described in U.S. Pat. No. 6,407,735.

SUMMARY

This application discloses various embodiments of improved methods and apparatus for cross-sectional scanning of transparent (or nearly transparent) parts that cannot be effectively scanned by the existing methods and apparatus as described in the patents cited above. These embodiments employ coatings added to such parts to create sufficient opacity where the coatings contact the parts that scanning of the coated part is not interpreted as scanning of the potting material into which the parts are placed.

One embodiment is a method of scanning a substantially transparent part having an outer surface. The outer surface of the part is coated with a coating material having an inner surface immediately adjacent the outer surface of the part. The result is encased into a potting material to form an assembly. Then, a portion of the assembly is removed to expose a surface, which is scanned. The coating material provides sufficient contrast compared to the potting material that such scanning recognizes the inner surface of the coating material differently than the potting material.

Other embodiments include a method of preparing the substantially transparent part, as described above, such that scanning will recognize the inner surface of the coating material differently than the potting material; as well as the coated part itself.

Yet another embodiment is a system for scanning a substantially transparent part having an outer surface. The system comprises: a data gathering station, a material removal station and a shuttle providing relative movement of the part between the stations along a path. The outer surface of the part bears a coating material having an inner surface immediately adjacent the outer surface of the part. The coated part is encased in a potting material to form an assembly. The system further comprises a means for removing a portion of the assembly to expose a surface. The coating material provides sufficient contrast compared to the potting material that such scanning recognizes the inner surface of the coating material differently than the potting material.

BRIEF DESCRIPTION OF THE DRAWINGS

The figures illustrate a preferred embodiment and thus it should be understood that minor changes in shape, proportion, size, and the like are not critical to the scope of the disclosure except as specifically noted elsewhere below.

DETAILED DESCRIPTION

In general terms, this application pertains to substantially improved versions of the methods and apparatus disclosed in U.S. Pat. Nos. 5,139,338; 5,261,648; 5,880,961; and 6,091,099. Each of these documents is incorporated by reference.

The known systems rely on optical contrast between the part to be scanned and the potting material in which the part is encased. As the scanning is performed in a grayscale mode, in which various shades of gray are detected, the potting material is essentially white so that pixels corresponding to it are below a lower detection threshold value, whereas the pixels that have grayscale values lying above an upper detection threshold value are deemed to correspond to the material of the part. Pixels having a grayscale value between the lower and upper detection threshold values are likely due to transitions between the potting material and the part material, i.e., they generally identify the locations (or nearby locations) of the edges of the part. In preferred, but non-limiting embodiments, in which a 8-bit grayscale is used, readings above a threshold value of about 200 to 220 are considered "white" (i.e., corresponding to the potting material) and values below a threshold value of about 20 to 40 are considered "black" (i.e., corresponding to the coating and thus the part).

Such systems cannot effectively scan parts that are made of transparent or substantially transparent materials, such as (for example) medical grade transparent polycarbonates. This is because such materials transmit the light impinging perpendicularly onto the potting/part surface straight down to locations deep inside the part/potting combination; when such locations are those where the deeply-embedded opposite surface of the part contact the potting material, the light is reflected upward by the potting material and back to the scanner. The net results are (1) the scanner is detecting potting material, not part; and (2) the scanner is detecting a location deep inside the combination, not the surface of the combination. Thus, the scanner has an erroneous reading for each of these two reasons.

Figure 1:
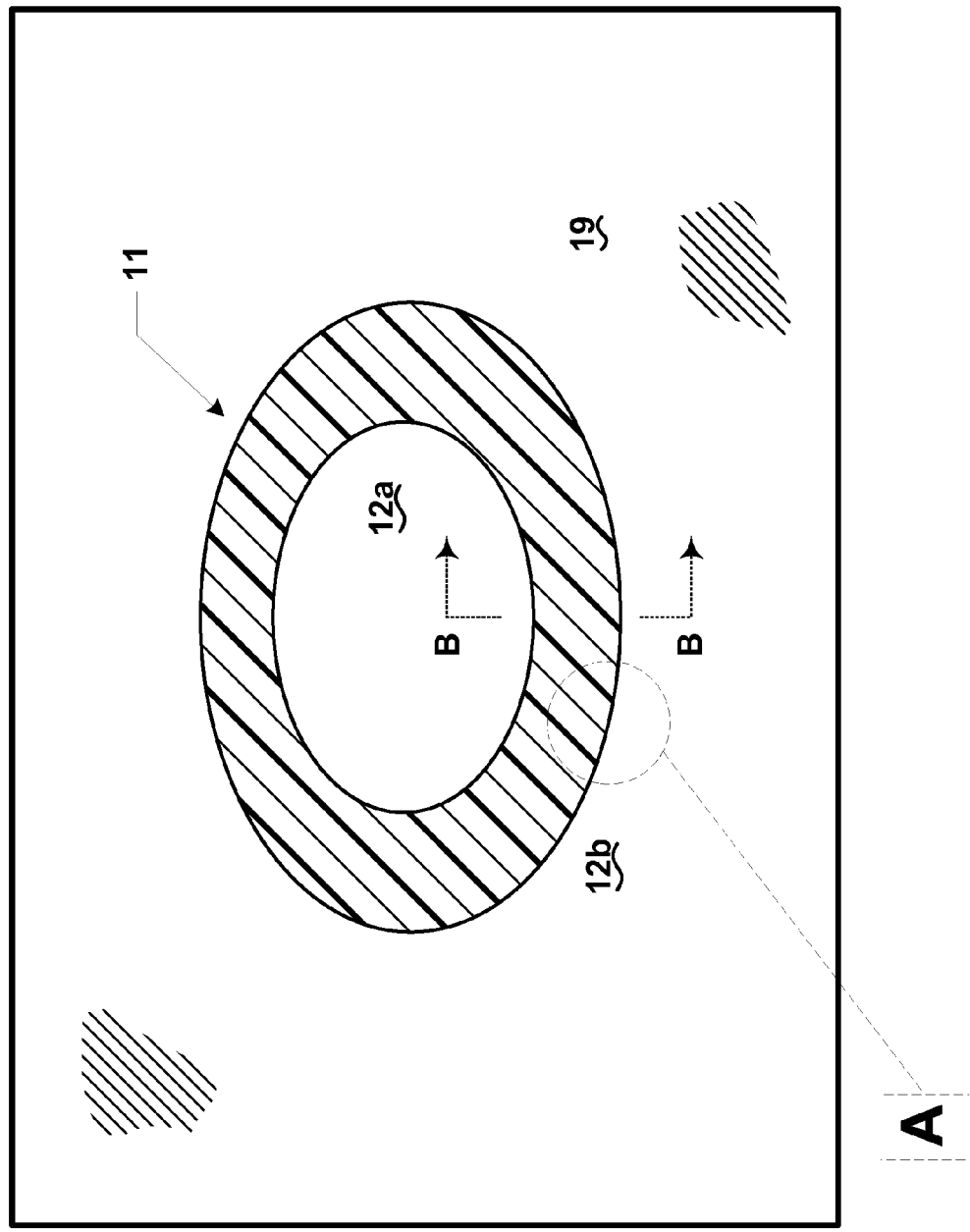
FIG. 1 is a top view of a schematic representation of an assembly comprising a coated part embedded in potting material.
Figure 2:
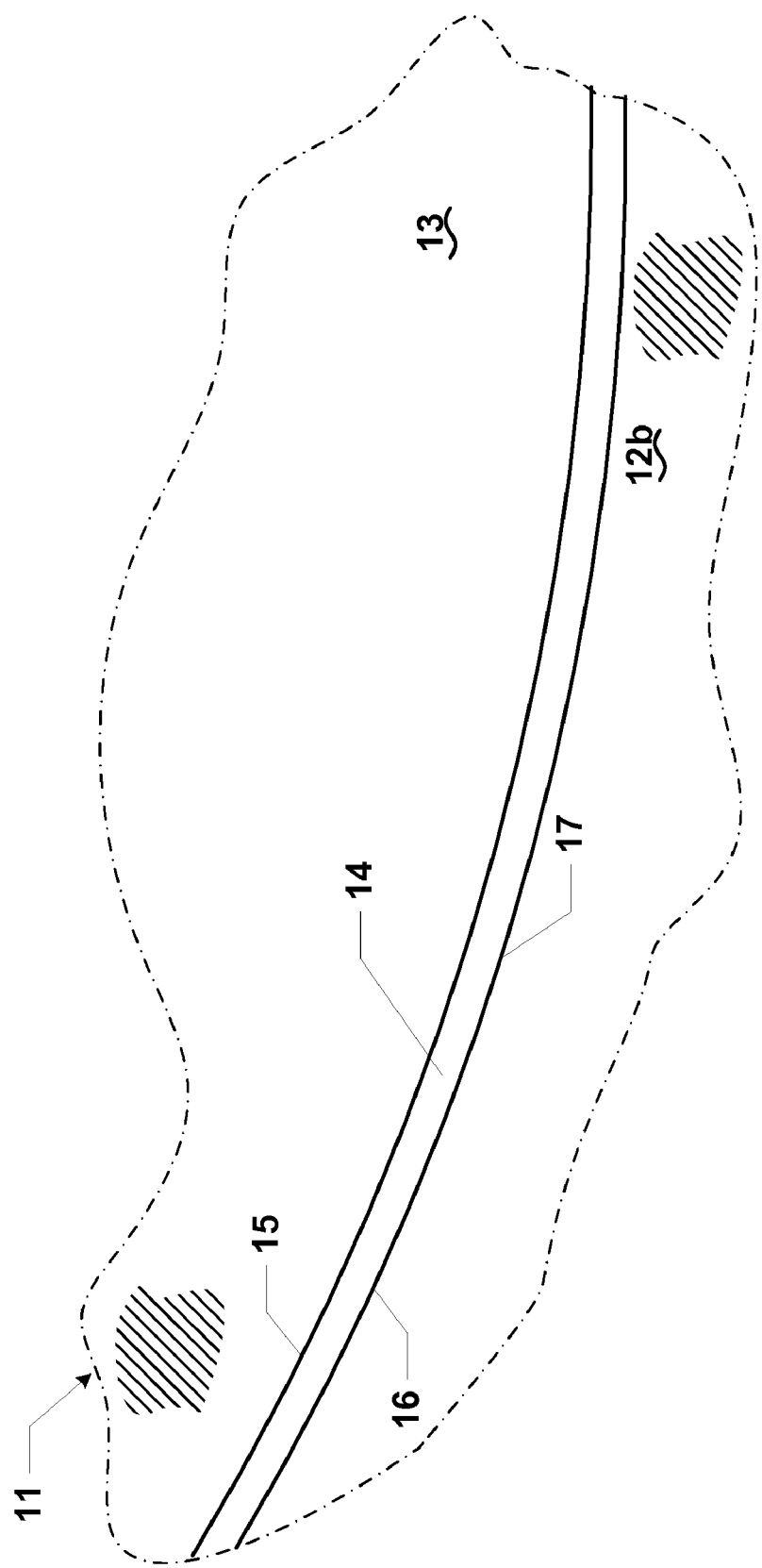
FIG. 2 is a close-up view of the portion of FIG. 1 indicated as A.
Figure 3:
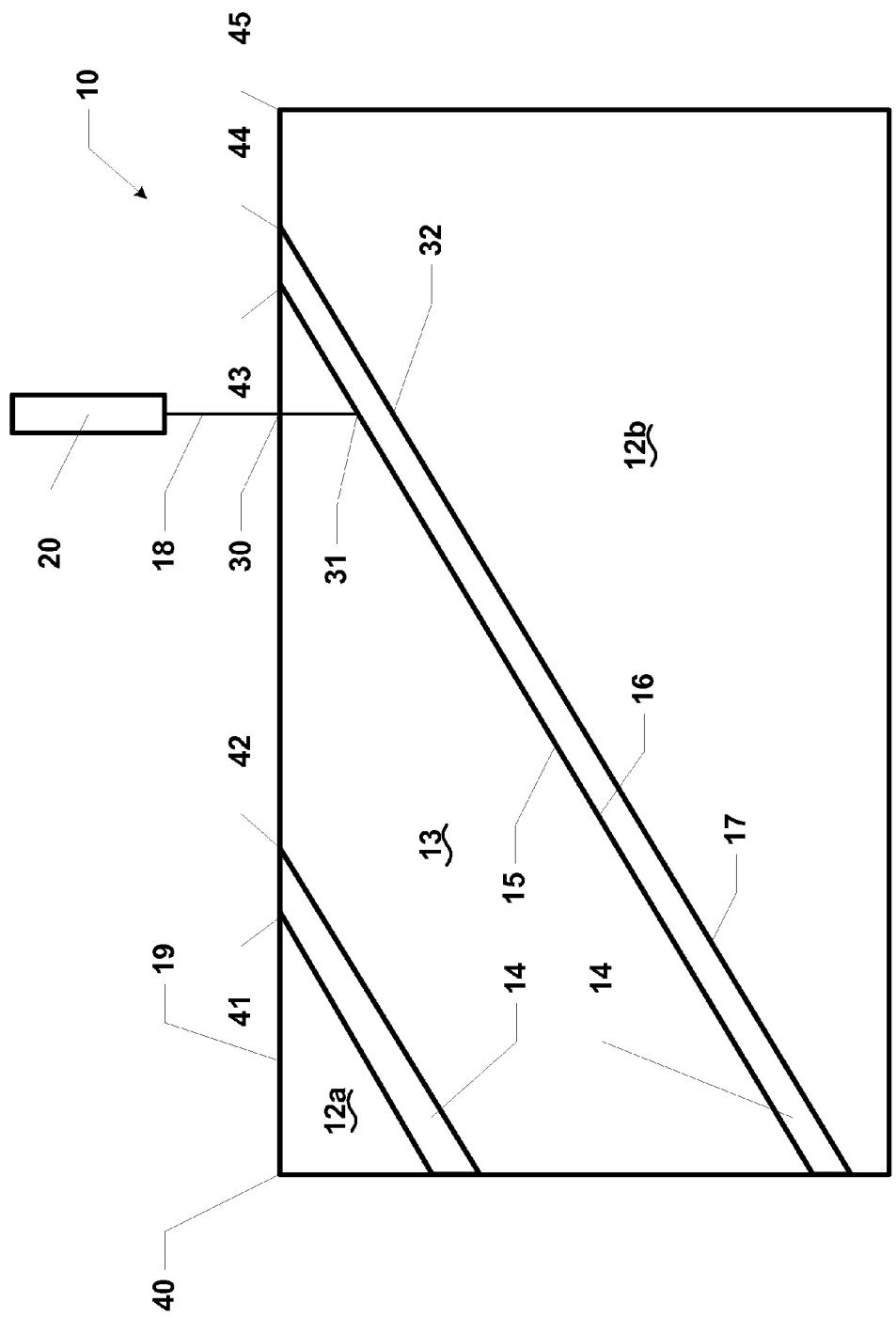
FIG. 3 is a side cross-sectional view of the portion of FIG. 1 illustrated in FIG. 2, taken along the line B-B in FIG. 1.

This is illustrated in FIGS. 1-3. FIG. 1 is a top view of a schematic representation of an assembly 10 which comprises coated part 11 embedded in potting material 12a, 12b. As shown, coated part 11 is hollow (at least in the vicinity of the plane of the figure), and thus potting material 12a lies within the inner volume of coated part 11 and potting material 12b surrounds coated part 11. This is only an illustration. In addition, the shape of coated part 11 is arbitrary, as is the orientation of coated part 11 within assembly 10. As illustrated, a slice of assembly 10 has been removed as part of the process of scanning the coated part 11. This results in a series of successively exposed surfaces 19 on the top side of assembly 10 (as illustrated, the plane of the Figure).

FIG. 2 is a close-up view of the portion of FIG. 1 indicated as A. This view identifies that coated part 11 comprises part 13 and coating 14. For purposes of description only, coating 14 has an appreciable thickness (not illustrated to scale) such that the inner surface 16 of coating 14 may be considered separately from the outer coating surface 17 of coating 14. As illustrated, coating inner surface 16 is immediately adjacent exterior surface 15 of uncoated part 13. Outer coating surface 17 is, therefore, in contact with potting material 12. It is not necessary that coating 14 have a uniform thickness but this is preferred and often the natural outcome of coating processes.

FIG. 3 is a side cross-sectional view of the portion of FIG. 1 illustrated in FIG. 2, taken along the line B-B in FIG. 1. This view illustrates that part 13 is coated on all its outer surfaces and thus, as illustrated, there are two sections of coating 14 on coated part 13. The section adjacent potting material 12a corresponds to the central or "hollowed" region illustrated in FIG. 1. This illustrates that, even though part 13 is hollow, the portions of part 13 that define the exterior of the hollowed-out region are exterior surfaces 15 as described above.

This figure also schematically illustrates that scanner 20 will detect light 18 that is reflected from coated part 11; for ease of illustration only, the incident light ray is not shown and only the reflected light ray 18 is considered. Light ray 18 is reflected from coated part 11 at point 31 (beneath exposed surface 19) because the opacity of coating 14 prevents light ray 18 from instead being reflected by the potting material 12 that would be present at that point in the absence of coating 14. Since the coating 14 is "dark" relative to the potting material 12, scanner 20 interprets light ray 18 as indicating that point 30 (on exposed surface 19 lying directly above point 31) is a location of part 13 even though part 13 is transparent between points 30 and 31.

Also, if coating material 14 is transparent (or nearly so), scanner 20 will detect potting material 12b because light ray 18 will be reflected at point 32 instead of point 31. Thus, coating material 14 must have sufficient opacity relative to part 13 (which is transparent or nearly so) and potting material 12b to enable appropriate detection by scanner 20. It is not necessary, however, for scanner 20 to distinguish coating 14 from both part 13 and potting material 12b. It is only necessary that coating 14 enable scanner 20 to avoid inaccurately detecting potting material 12b through the transparent material of part 13 at point 32 and thus be unable to identify that part 13 is located at point 30.

The same result holds as the scanner samples the entire face of assembly 10, between points 40 and 45, and particularly as it samples the points 41-44 illustrated in FIG. 3. Thus, scanner 20 detects coated part 11 as lying between points 41 and 44; computer processing of the data enables the system to compensate for the known (or estimated) thickness of coating 14 and thus derive the true location of part 13 as lying between points 42 and 43.

It is important to note that, in operation, the scanner 20 is not detecting the exterior surface 17 of the coating 14; such material (if present) has been removed along with the portion of the potting material 12 (and the coated part 11 itself, including part 13) that was removed immediately before the scan. Rather, the portion of the coating material that is being detected is the "inside" or "wetted" surface 16—the portion immediately adjacent the exterior surface 15 of the part 13 to which the material of coating 14 has been applied. And, such inside surface 16 is located on the portion of the part directly below the scanning surface—even if it is below such surface by a relatively substantial amount, such as the distance between points 30 and 31.

Figure 4:
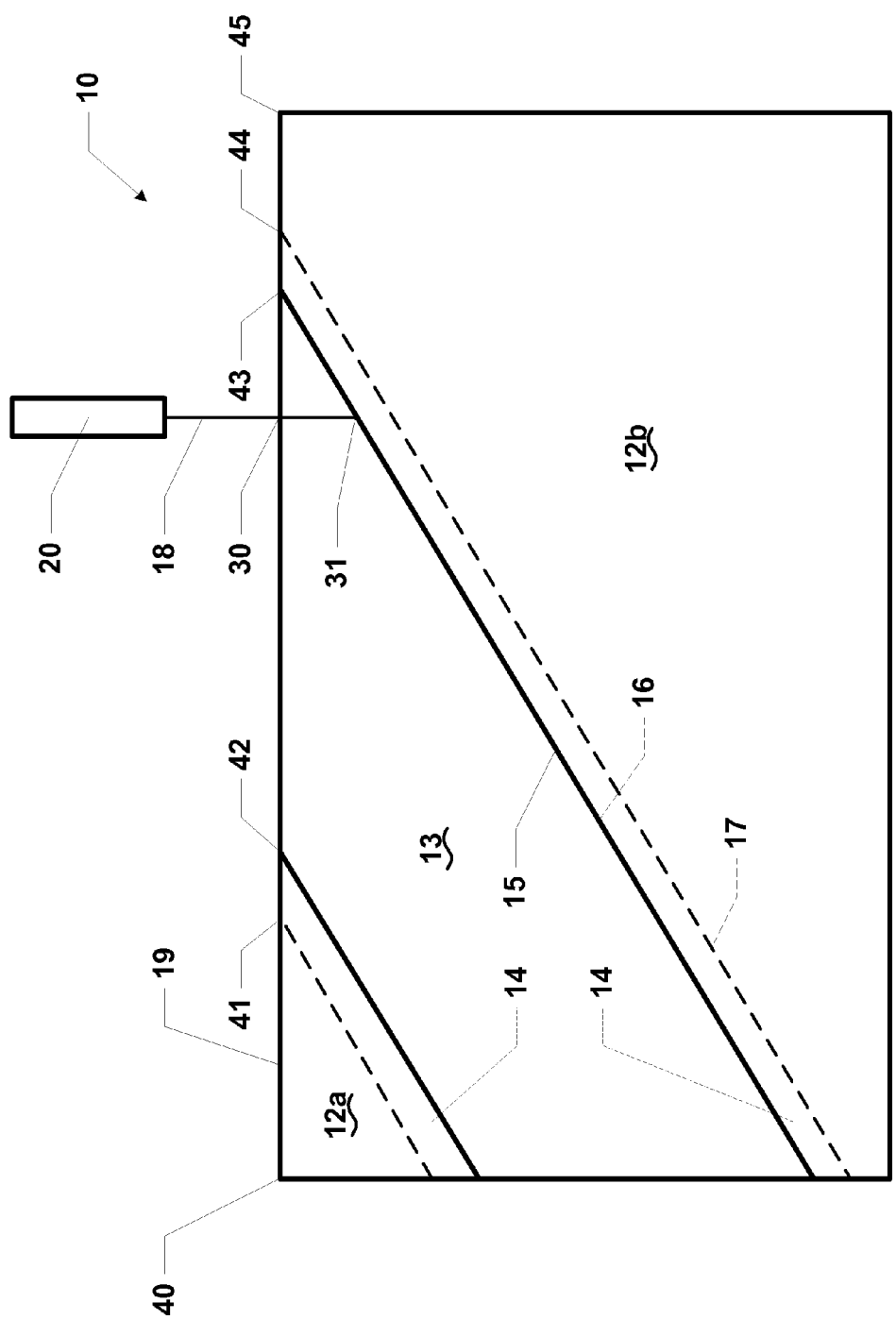
FIG. 4 is a side cross-sectional view similar to that of FIG. 3, but illustrating the absence of a coating from a part embedded in potting material.

This is illustrated by considering FIG. 4, which is similar to FIG. 3 but omits coating 14 as indicated by dashed lines at the former location of the outer coating surface 17. Thus, while the location and dimensions of part 13 are the same in FIG. 4 as in FIG. 3, potting material 12a, 12b contacts external surface 15 directly. If part 13 is opaque, scanner 20 easily detects potting material 12a along exposed surface 19 between points 40 and 42, part 13 between points 42 and 43 (including point 30), and potting material 12b between points 43 and 45. But if part 13 is transparent, scanner 20 detects potting material 12b that lies below part 13 points 42 and 43 (including point 31), and thus fails to accurately detect part 13. Instead, scanner 20 inaccurately detects potting material 12a, 12b entirely between points 40 and 45.

For ease of illustration, scanner 20 is schematically illustrated as a single-point device. In general, scanner 20 is any single pixel of a multi-pixel scanner, camera, or similar optical image capture device such as a CCD array, line scan camera, or area scan camera. Scanner 20 could, indeed, be a single point scanner that traverses the face of assembly 10 in one or two directions, but this is not an essential feature. In fact, high resolution (megapixel per square inch or greater) image capture equipment is preferred for scanner 20. In this case, a preferred, but not limiting, thickness of each slice is one thousandth (0.001) inch. This combination results in data points measured at a scale that is one thousandth (0.001) inch in each of the three orthogonal primary directions.

The techniques described above may be contrasted to the disclosure of U.S. Pat. No. 5,139,338 of Pomerantz et al., which states than an area of a part may be covered by a relatively think layer of paint or other marking substance. Pomerantz et al. identifies three different "color-to-color" interfaces, which clearly suggests that they do not even contemplate a transparent part to begin with. Furthermore, Pomerantz et al. explictly state that the interface between the paint or other marking material and the support or potting material is ignored as not being of interest. By contrast, the techniques described here specifically embrace this interface as critically important to cross-sectional scanning of transparent parts.

The identity of the material of the coating is dictated by several requirements: (1) it must fully coat (or "wet") all surfaces of the part to a (nearly) uniform thickness; (2) it must not transmit light, i.e., there is sufficient absorption by the coating at the surface of the part to cause detection by the scanner. In testing, cadmium coatings of approximately 10-20 millionths of an inch in thickness were not effective. Copper coatings in the same thickness range were better than cadmium coatings but had inadequate metrology. Coatings of a commercially available copper/nickel combination or nickel alone, again in the same thickness range, were effective and are thus preferred.

Thus, depending on the exact material chosen, the thickness of the coating may be in the range of about 10 to about 100 millionths of an inch without losing effectiveness. Thicknesses in this range are not so thin as to be overly transparent regardless of chemical composition. Nor are they so thick as to substantially alter the size of the part being scanned and/or affect the resolution of the dimensions of the scanned part as interpreted by the post-scanning computer. That is, even a coating at the largest end of this range, 100 millionths of an inch, has a thickness dimension that is only about one-tenth the dimension of a single pixel in the preferred embodiment (i.e., use of a megapixel/square-inch scanner and removal of one thousandth of an inch per each removed layer). This is effectively below the resolution of the scanner but if necessary it can be accounted for mathematically in the processing of the data gathered by the scanner. It was found that coatings on the order of five thousands of an inch (that is, five thousand times one-millionth of an inch) were so thick as to undesirably change the edge geometry of the part being scanned. It should be remembered that provided sufficient contrast is provided by the thickness of the coating material (for a given material composition), any additional thickness of the coating does not contribute to improved performance. Thus, an effective upper limit to the coating thickness may be established by determining when the rate of change of contrast between coated and uncoated parts is no longer sufficient to improve the ability of the scanner to identify the coated part. An effective lower limit to the coating thickness is believed to be on the order of one millionth of an inch, provided that sufficient contrast to identify the coated part is provided as described above.

While not necessary with the coatings identified above, it may be advantageous with other coatings to adjust the gray-scale range and detection threshold values employed by the scanner.

A suitable method of coating the part is the well-known and commercially available electroless plating approach. In this method, the part is first pre-treated or etched to improve adhesion, followed by immersion in a bath of metal particles dissolved into the coating or plating solution. It may also be possible to produce suitable coatings by other methods, possibly including immersion of the parts in gas instead of liquid.

References to thickness measurements should be understood as referring to measurements taken normal to the surface of the part. This may or may not correspond to the appearance of the coating in the Figures. The part typically is oriented at some non-orthogonal angle within the potting material and thus distances measured in the principal X, Y, and Z planes may expose amounts of coating that are greater than or less than the thickness as measured normal to the surface of the part at the location of measurement.

While coatings comprising a single material and/or a single layer are preferred and described above, the term "coating" (as a noun) should be understood as including any material having the requisite properties, whether it comprises a single material, multiple materials, a blend of multiple materials, a doped or otherwise modified material, and so on. Similarly, multiple layers of individual materials may function as a coating, as may materials having variances in their composition. As a verb, to "coat" or perform "coating" should be understood as producing any optical contrast between the transparent part and the potting material at the interface between the two.

The preferred, but not required, technique to convert the scanning data is disclosed in the patents incorporated by reference above, as well as U.S. Pat. No. 6,407,735, which is also incorporated by reference.

Application to Cross-Sectional Scanning Systems

The techniques described above may be employed in a cross-sectional scanning system of the following general design. Details of particular embodiments of such systems are in the patents incorporated by reference above.

The system produces electronic data representations of an object or part. The major components of the system are: (1) a data gathering station; (2) a material removal station; and (3) a shuttle providing relative movement of the part between those two stations along a path. The data gathering station typically, but not necessarily, comprises: (1) an image data acquisition device for successively acquiring images of the part after removal of a predetermined contour; and (2) an electronic device operatively associated with the image data acquisition device for receiving and storing the images. The material removal station typically, but not necessarily, comprises: (1) a tool constructed and arranged to remove a predetermined contour of material from the part; and (2) a drive mechanism constructed and arranged to provide relative movement between the tool and the part. The shuttle typically, but not necessarily, comprises: (1) a table for holding the part; (2) a drive mechanism constructed and arranged to provide relative movement between the table and the tool along the path; and (3) a means to determine the relative locations of the part and the tool along the path.

The operation of a typical configuration of such a system is as follows. The image data acquisition device successively acquires images of the part after removal of a predetermined contour. The tool is moved into and out of relative material removing engagement with the part. The relative movement between the table and the tool along the path is such that the part and the tool are moved in material removal alignment for removing a predetermined contour of material from the part and in imaging alignment to the image data acquisition device after removal of a predetermined contour. The position determining apparatus actuates the image data acquisition device at predetermined positions of the part relative to the tool. For example, a linear encoder with a scale, a sensor, and a computer may be arranged to send signals to the computer in response to the relative movement between the sensor and the scale. The computer is programmed to determine the position of the scale relative to the sensor in response to the signals received from the sensor. Thus, because the scale and sensor are operatively associated with each other, the position of the part relative to the tool along the path is incrementally determined by the computer.

Commercial embodiments of such systems employ visible light (400-700 nm wavelength) for illumination and scanners sensitive to light typically having a wavelength centered on 550 nm. However, such values are not critical provided that sufficient contrast is provided at the detection wavelength chosen. Similarly, while directly impinging illumination and scanning normal to the surface have been illustrated, as is commecially common, more complicated geometries are possible but not preferred. While the above description refers to many specific details for the sake of explanation, these details should not be construed as limitations unless explicitly included in the following claims.

I claim:

1. A method of scanning a substantially transparent part having an outer surface, the method comprising the steps of:
   (a) coating the outer surface of the part with a coating material having an inner surface immediately adjacent the outer surface of the part;
   (b) encasing the result of step (a) into a potting material to form an assembly,
   (c) removing a portion of the assembly to expose a surface, and
   (d) scanning the surface; in which the coating material provides sufficient contrast compared to the potting material that such scanning recognizes the inner surface of the coating material differently than the potting material.

2. The method of claim 1, in which the step of scanning identifies the inner surface of the coating material adjacent the outer surface of the transparent part, at a location beneath the surface of the assembly.

3. The method of claim 1, in which the part is coated to a thickness in a range of about ten millionths of an inch to about 100 millionths of an inch.

4. The method of claim 1, in which the part is coated with a single material.

5. The method of claim 1, in which the part is coated to a uniform thickness.

6. A method of scanning a substantially transparent part having an outer surface, the method comprising the steps of:

(a) coating the outer surface of the part with a coating material having an inner surface immediately adjacent the outer surface of the part;
(b) encasing the result of step (a) into a potting material to form an assembly;
(c) removing a portion of the assembly to expose a newly exposed assembly surface; and
(d) scanning the newly exposed assembly surface; in which the coating material provides sufficient contrast compared to the potting material so that such scanning recognizes a difference between the inner surface of the coating material and the potting material.

7. The method of claim 6, in which the step of scanning identifies the inner surface of the coating material adjacent the outer surface of the transparent part at a location beneath the newly exposed assembly surface of the assembly.

8. The method of claim 7, wherein, following the scanning step, the step of removing is repeated and the step of scanning is repeated after the step of removing.

9. The method of claim 8, in which the step of removing and the step of scanning are repeated again and again in succession to one another until the coated part encased in the assembly is completely removed from the assembly as a result of the repeated steps of removing a portion of the assembly to expose a series of newly exposed assembly surfaces.

10. The method of claim 9, wherein the repeated steps of scanning that follow each of the respective steps of removing each result in the collection of data that can be used to generate an image of the part.

11. The method of claim 6, in which the part is coated with the coating material to a thickness in a range of about ten millionths of an inch to about 100 millionths of an inch.

12. The method of claim 6, in which the part is coated with a single material.

13. The method of claim 6, in which the part is coated to a uniform thickness.

14. A method of scanning a substantially transparent part having an outer surface, the method comprising the steps of:
(a) coating the outer surface of the part with a coating material having an inner surface immediately adjacent the outer surface of the part;
(b) encasing the result of step (a) into a potting material to form an assembly,
(c) removing a portion of the assembly to expose a newly exposed assembly surface,
(d) scanning the newly exposed assembly surface; in which the coating material provides sufficient contrast compared to the potting material so that such scanning recognizes a difference between the inner surface of the coating material and the potting material; and
(e) repeating both the step of removing and the step of scanning again and again in succession to one another until the coated part encased in the assembly is completely removed from the assembly as a result of the repeated steps of removing a portion of the assembly to expose a series of newly exposed assembly surfaces;
wherein the respective steps of scanning identify the inner surface of the coating material adjacent the outer surface of the transparent part at a location beneath each of the newly exposed assembly surfaces of the assembly that result from each of the respective removing steps; and
wherein the repeated steps of scanning that follow each of the respective steps of removing result in the collection of data that can be used to generate an image of the part.

15. The method of claim 14, in which the part is coated with the coating material to a thickness in a range of about ten millionths of an inch to about 100 millionths of an inch.

16. The method of claim 14, in which the part is coated with a single material.

17. The method of claim 14, in which the part is coated to a uniform thickness.

\* \* \* \* \*